(12) United States Patent
Dawson et al.

(10) Patent No.: US 12,010,381 B2
(45) Date of Patent: Jun. 11, 2024

(54) ORIENTATION CONTROL OF DISPLAY DEVICE BASED ON CONTENT

(71) Applicant: SONY GROUP CORPORATION, Tokyo (JP)

(72) Inventors: Thomas Dawson, Escondido, CA (US); Steven Richman, Parker, CO (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/303,997

(22) Filed: Jun. 11, 2021

(65) Prior Publication Data

US 2022/0400310 A1   Dec. 15, 2022

(51) Int. Cl.
| | |
|---|---|
| H04N 21/442 | (2011.01) |
| G06K 9/00 | (2022.01) |
| G06T 7/73 | (2017.01) |
| G06V 40/16 | (2022.01) |
| H04N 21/258 | (2011.01) |
| H04N 21/262 | (2011.01) |
| H04N 21/4223 | (2011.01) |
| H04N 21/475 | (2011.01) |
| H04N 21/81 | (2011.01) |

(52) U.S. Cl.
CPC ......... *H04N 21/44218* (2013.01); *G06T 7/73* (2017.01); *G06V 40/176* (2022.01); *H04N 21/25883* (2013.01); *H04N 21/26258* (2013.01); *H04N 21/4223* (2013.01); *H04N 21/4755* (2013.01); *H04N 21/812* (2013.01)

(58) Field of Classification Search
CPC ....... H04N 21/44218; H04N 21/25883; H04N 21/26258; H04N 21/4223; H04N 21/4755; H04N 21/812; H04N 21/252; H04N 21/25891; H04N 21/41415; H04N 21/44222; H04N 21/6582; H04N 5/655; G05D 1/0088; G05D 1/0214; G06Q 30/0242; G06Q 30/0266; G06Q 30/0269; G06Q 30/0645; G06V 20/593; G06V 40/161; G06V 40/178
See application file for complete search history.

(56) References Cited

U.S. PATENT DOCUMENTS

| | | | |
|---|---|---|---|
| 7,921,036 B1 * | 4/2011 | Sharma ............. | G06Q 20/3674 705/52 |
| 10,672,031 B2 | 6/2020 | Canceri et al. | |
| 2003/0028873 A1 * | 2/2003 | Lemmons ........ | H04N 21/25883 348/588 |

(Continued)

FOREIGN PATENT DOCUMENTS

CN   103760968 A   4/2014

*Primary Examiner* — Rong Le
(74) *Attorney, Agent, or Firm* — CHIP LAW GROUP

(57) ABSTRACT

An electronic device including a display device configured to render first content. The electronic device is communicably coupled to the display device and controls one or more imaging devices to receive one or more images from the one or more imaging devices. The electronic device further determines a first position of one or more living objects within a pre-defined region from the display device, based on the received one or more images and the rendered first content. The electronic device further controls an orientation of the display device towards the determined first position of the one or more living objects.

20 Claims, 7 Drawing Sheets

(56) References Cited

U.S. PATENT DOCUMENTS

| | | |
|---|---|---|
| 2008/0004953 A1 | 1/2008 | Ma |
| 2009/0010499 A1* | 1/2009 | Cermeno Mediavilla ................... G06Q 30/00 382/118 |
| 2009/0025022 A1 | 1/2009 | Blatchley |
| 2009/0177528 A1* | 7/2009 | Wu .................... G06Q 30/0254 725/12 |
| 2016/0094894 A1 | 3/2016 | Inayatullah |
| 2018/0232770 A1 | 8/2018 | Miller et al. |
| 2019/0004570 A1* | 1/2019 | Lo ......................... G06F 1/1686 |

\* cited by examiner

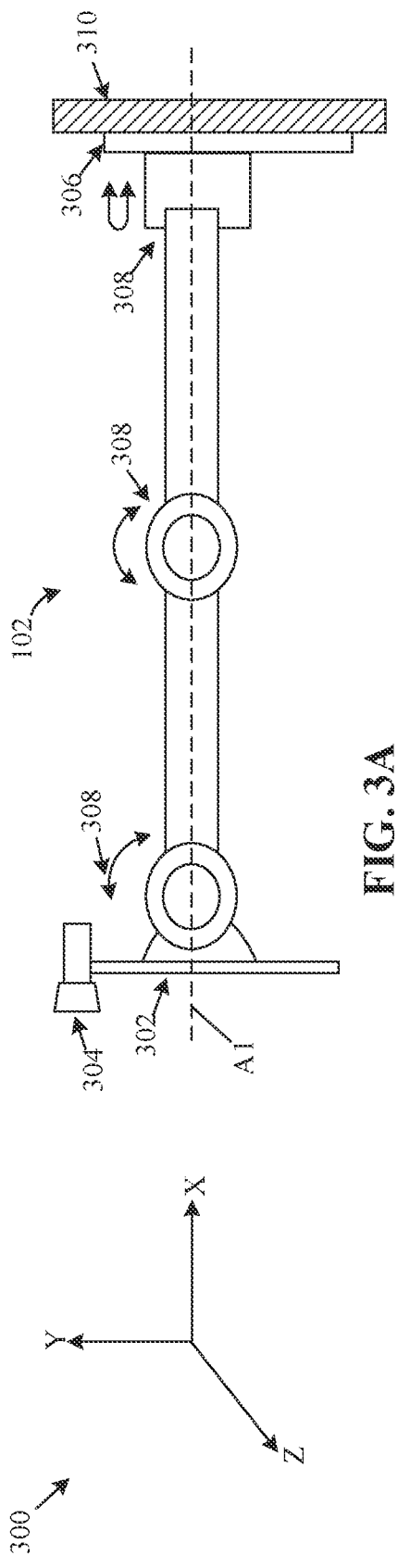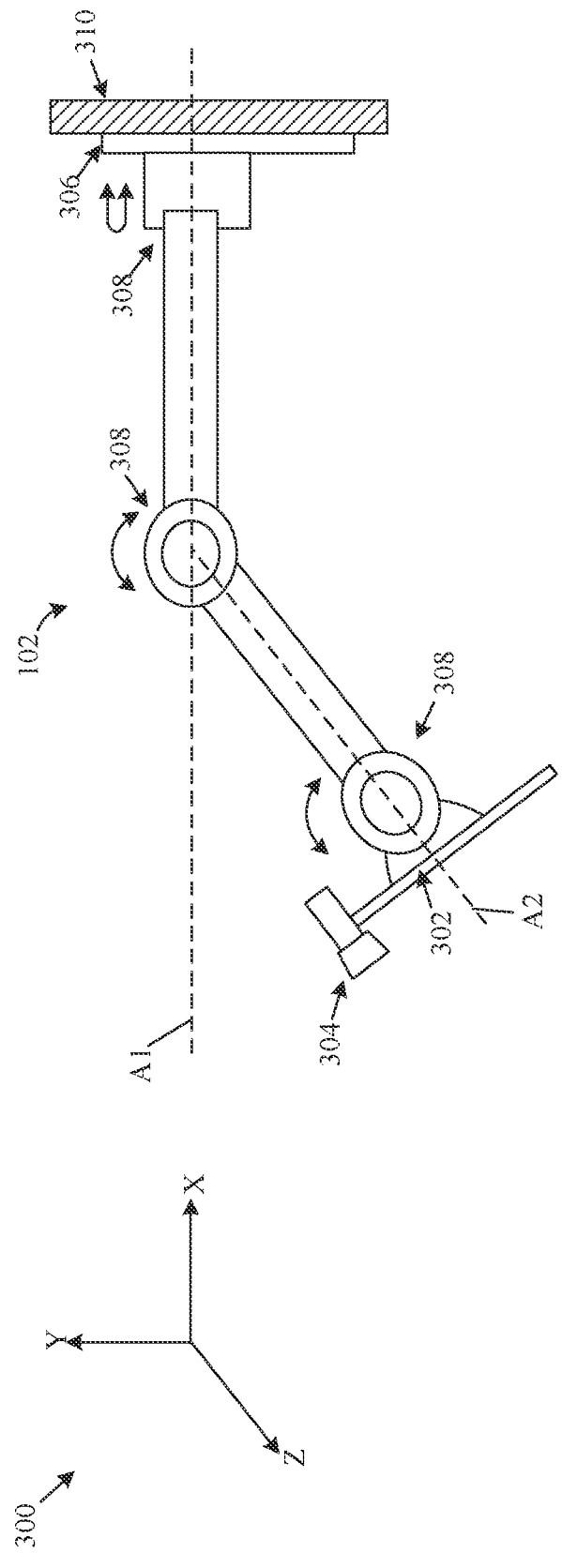
FIG. 3A
FIG. 3B

ORIENTATION CONTROL OF DISPLAY DEVICE BASED ON CONTENT

CROSS-REFERENCE TO RELATED APPLICATIONS/INCORPORATION BY REFERENCE

None

TECHNICAL FIELD

Various embodiments of the disclosure relate to display devices. More specifically, various embodiments of the disclosure relate to a device, a method and a computer program product to control orientation of a display device based on content.

BACKGROUND

With advancement in various technologies, electronic devices with newer capabilities and features are becoming more prominent in the market. Usually display devices may be placed at a number of places, such as malls, airports and other public places to render content that may be chosen by a service provider. The content rendered on the display devices may be situational based, where the display devices may render the content based on a certain purpose determined by the service provider, such as based on the location, or the content may be of different categories such as entertainment, educational, sports, advertisements, marketing, etc.

Typically, in certain places (for example a school or educational institutions, etc.) where a viewer or an audience of the display device is known or may be of pre-defined type (like students, professors, etc.), the display device may be fixed at various pre-defined locations and specifically selected or pre-defined content may be rendered on the display device. Such selected or pre-defined content may be specific educational content or known promotional content targeting specific audience, which may result in a target impact of the content for the audience.

In certain other cases, however, in particular situation/places, where the audience (and/or viewer's interests or other qualities associated with the audience) is not known or predefined, then the specific content, for example an product advertisement rendered on the display device may not create a higher impact on the diverse audience of the display device. This may not be desired by the service provider (i.e. owner) associated with the display device or associated with the rendered content. In such a scenario, lower impact of the content may result, for example, loss of business or revenue for the service provider as the content may not have the right or desired impact on the audience.

Further limitations and disadvantages with respect to conventional and traditional approaches will become apparent to one of ordinary skill in the art, through comparison of described systems with some aspects of the present disclosure, as set forth in the remainder of the present application and with reference to the drawings.

SUMMARY

A device and a method for orientation control of a display device based on content is disclosed, and provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIGS. 3A and 3B are diagrams that collectively illustrate exemplary display device and orientation mechanism, in accordance with an embodiment of the disclosure.

DETAILED DESCRIPTION

Figure 1:
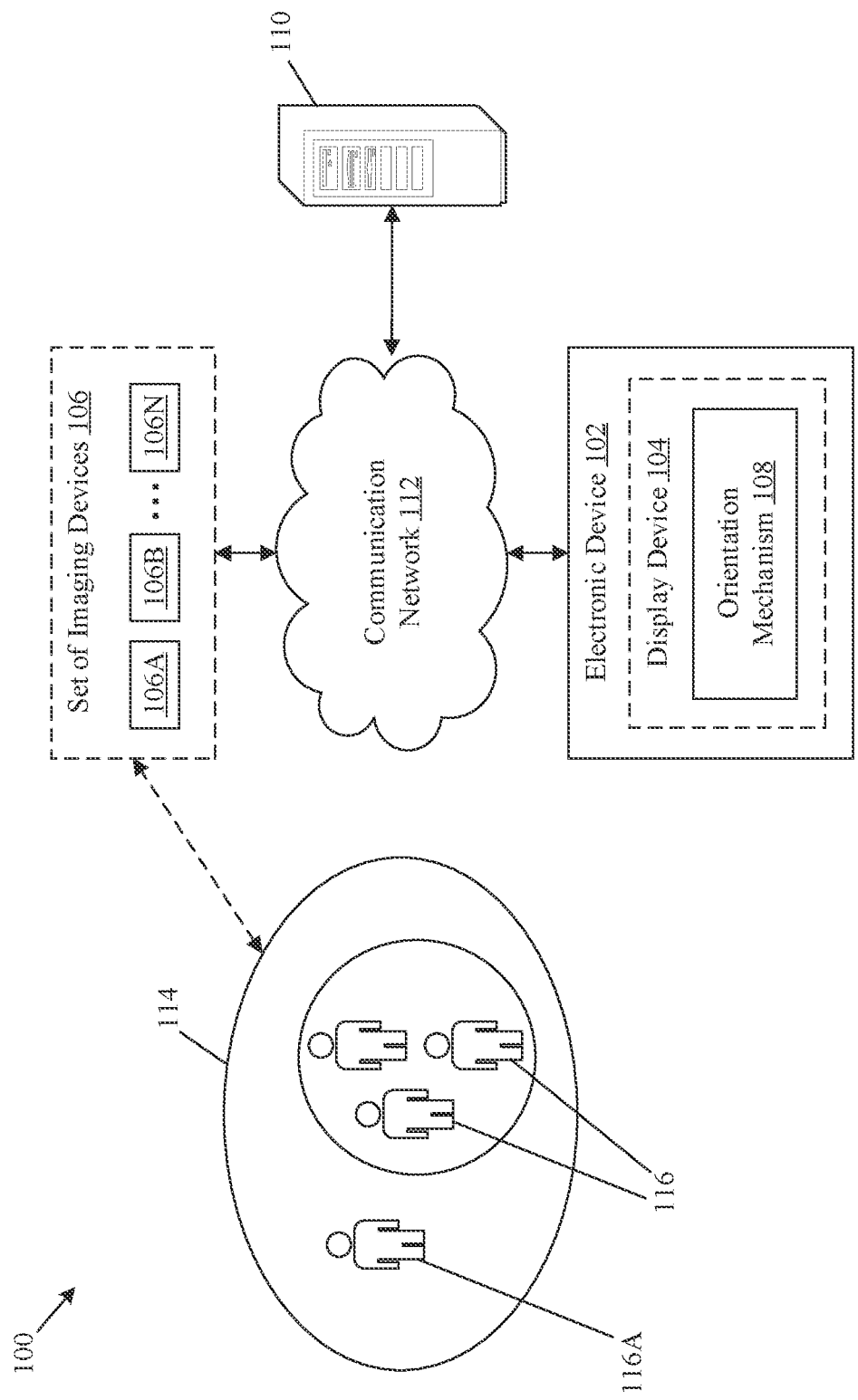
FIG. 1 is a block diagram that illustrates an exemplary environment for orientation control of a display device based on content, in accordance with an embodiment of the disclosure.

The following implementations described herein may be found in a disclosed electronic device and a method to control orientation of a display device towards a living object (such as humans) based on content being streamed and/or rendered on the display device. Exemplary aspects of the present disclosure provide an electronic device, which may include and/or control a display device configured to render a first content, for example, but not limited to, an advertisement or a promotional content or a pre-defined program or a live stream of a program. The electronic device may further include one or more processors that may be communicably coupled to the display device, (for example a display screen, Television (TV), a monitor, etc). In an embodiment, the one or more processors may be located within the electronic device or may be in an external device that may be communicably interfaced or coupled with the electronic device. The electronic device may be further configured to control one or more imaging devices coupled or interfaced with the electronic device. The imaging devices may be located proximate to the display device, preferably within a certain predefined region/area. The electronic device may control the one or more imaging devices to receive one or more images and/or a video stream from the one or more imaging devices, which may be coupled to the electronic device. The imaging device may include, but are not limited to, a camera, an imaging sensor, and the like.

The electronic device may be further configured to determine a first position, for example a three-dimensional position, of one or more living objects (such as human, animals, etc.) within the predefined region from the display device, based on the one or more images and/or video streams received from the one or more imaging devices proximate to the display device and based on the first content rendered on the display device. The received one or more images may include images of one or more living objects, and the electronic device may be configured to preferably determine living objects (i.e. humans) in the one or more images and/or video streams. The living objects whose position (i.e. first position) is determined, may be relevant to the first content currently being rendered on the display device. In other words, based on the first content currently rendered, the disclosed electronic device may search the living objects (and their first positions within the predefined region) to whom the rendered first content may be relevant. The electronic device may be further configured to track movement of the living objects within the predefined region/area including the display device or track movement of the living objects into another predefined space/area, where the first content may be rendered by another display device. Accordingly the electronic device may be configured to transfer control from the display device to the other display device for seamless rendering of the first content to be viewed by the living objects.

Further, based on the determination of the first position of the relevant living objects, the electronic device may be further configured to control orientation of the display device towards the determined first position of the one or more living objects (or towards a second position of the living object, if the living object has moved from the initial first position to the second position). Therefore, the disclosed electronic device may be configured to determine the first content rendered currently on the display device, for example an advertisement or promotional content, and accordingly select and/or search living objects within the predefined region (or around the display device) and orient the display device towards the selected one or more living objects who may be relevant to the rendered first content. Based on the real-time selection of the living objects for the rendered first content and orientation of the display device towards the selected living objects, the display device may display the first content to a targeted or relevant audience for whom the first content may be more relevant and/or may create a higher impact, for example, which may result in an increase in sales or revenue of a product/service or an owner associated with the first content or associated with the display device. In accordance with an embodiment, the disclosed electronic device may further select and render second content or pre-determined content (i.e. different from the first content) to the selected one or more living objects based on different associated factors, such as demographics, profile, facial expressions, gesture, and the like.

FIG. 1 is a block diagram that illustrates an exemplary environment for orientation control of a display device based on content, in accordance with an embodiment of the disclosure. With reference to FIG. 1, there is illustrated an environment 100 which may include an electronic device 102 and a set of imaging devices 106 coupled to the electronic device 102, via a communication network 112. The electronic device 102 may include a display device 104 which may further include an orientation mechanism 108. In an embodiment, the electronic device 102 and the display device 104 may be a single unit (as shown in FIG. 1). In another embodiment, the electronic device 102 may be communicably coupled to the display device 104 and the orientation mechanism 108. The set of imaging devices 106 may include a series of imaging devices such as a first imaging device 106A, a second imaging device 106B, and an Nth imaging device 106N. The set of imaging devices 106 may be preferably proximate to the display device 104. The set of imaging devices 106 and the electronic device 102 may be communicatively coupled to a server 110, via the communication network 112. In FIG. 1, there is further shown a predefined region/space 114 that may be monitored by the set of imaging devices 106 and may be proximate to (or include) the display device 104. The predefined region 114 may include one or more living objects 116 and/or non-living objects (not shown in FIG. 1).

The electronic device 102 may include suitable logic, circuitry, and interfaces that may be configured to control content (i.e. first content) being rendered on the display device 104 for one or more living objects 116, and further control orientation of the display device 104 towards one of more living objects 116, based on the rendered first content. The electronic device 102 may be configured to render the first content either in real-time or from a pre-defined content playlist stored in a memory (shown in FIG. 2) of the electronic device 102 or may be selected by a content/service provider who owns the electronic device. Examples of the electronic device 102 may include, but are not limited to, a computing device, a smartphone, a cellular phone, a mobile phone, a gaming device, other portable electronic devices such as a PDA, tablet, a mainframe machine, a server, a computer workstation, and/or a consumer electronic (CE) device.

The display device 104 may include suitable logic, circuitry, and interfaces that may be configured to display or render information or the first content, which may be viewed by a user or a group of users (such as one of more living objects 116). In an embodiment, the display device 104 may be a touch screen which may enable a user to provide a user-input via the display device 104. The touch screen may be at least one of a resistive touch screen, a capacitive touch screen, or a thermal touch screen. The display device 104 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 104 may refer to a display screen of a head mounted device (HMD), a smart-glass device, a see-through display, a projection-based display, an electro-chromic display, a transparent display, a Plasma Television (TV), LCD TV, LED TV, OLED TV, Smart TV, etc., on which the first content may be rendered either in real-time or from a pre-defined content playlist stored in a memory (shown in FIG. 2) of the electronic device 102 or as selected by a content/service provider.

Each of the set of imaging devices 106 may include suitable logic, circuitry, or interfaces that may be configured to capture an image and/or a plurality of images and/or video stream of the predefined region 114 which may include one or more living objects 116 (such as humans). The set of imaging devices 106 may include the first imaging device 106A, the second imaging device 106B, and an Nth imaging device 106N. The set of imaging devices 106 may be further configured to capture frames, images, or video continuously, and transmit the captured images and/or videos to the electronic device 102 for further processing (i.e. such as determination or recognition of living objects, preferably humans, in the captured images and/or videos). In an embodiment, the set of imaging devices 106 may receive instructions from the electronic device 102 to capture images/videos of the predefined region 114. Examples of the set of imaging devices 106 may include, but are not limited to, an image sensor, an image capture device, a wide-angle camera, an action camera, a closed-circuit television (CCTV) camera, a camcorder, a digital camera, camera phones, a time-of-flight camera (ToF camera), a night-vision camera, and/or other image capture devices.

The set of imaging devices 106 may be located at pre-defined positions or may be distributed in the predefined region 114 at predetermined locations so that the set of imaging devices 106 may monitor or track one or more living objects 116 present in the predefined region 114. The set of image devices 106 may be configured to monitor the predefined region 114 and identify one or more living objects 116 in the predefined area 114, such that the display device 104 may further orient itself in the direction of one or more selected living objects (such as a living object 116A shown in FIG. 1) and render the first content to one or more selected living objects. In an embodiment, at least one of the set of imaging devices 106 may be integrated into the display device 104 or mounted on the display device 104. In an embodiment, at least one of the set of imaging devices 106 may be integrated within the electronic device 102.

In an example embodiment, one of the set of imaging devices 106 may be a 360-degree camera (not shown in FIG. 1) and may include suitable logic, circuitry, or interfaces that may be configured to capture a 360-degree view of the surroundings (i.e. predefined region 114) of the display device 104. In accordance with an embodiment, the 360-degree camera may further include a plurality of image sensors (not shown in FIG. 1) to capture the 360-degree view of the surroundings (such as the predefined region 114) of the display device 104. Each image sensor of the plurality image sensors may be configured to capture a portion of the 360-degree view of the surroundings of the display device 104. In accordance with an embodiment, the 360-degree camera may be configured to stitch each captured portion of the plurality image sensors to generate the 360-degree view of the surroundings of the display device 104. In accordance with an embodiment, the 360-degree camera may be installed on the display device 104. Examples of the 360-degree camera may include, but are not limited to, an omnidirectional camera, a panoramic camera, an action camera, a wide-angle camera, a closed-circuit television (CCTV) camera, and/or other image capturing or devices with 360-degree view capturing capability.

The orientation mechanism 108 may include logic and/or interfaces that may be configured to control the orientation of the display device 104. The orientation mechanism 108 may receive instructions from the electronic device 102 to control the orientation of the display device 104. The instruction may include an angle of orientation, or 3D position of the predefined region 114 towards which the display device 104 is to be oriented or tilted. The orientation mechanism 108 may include one or more actuators to control the orientation of the display device 104 in different directions. In some embodiments, the orientation mechanism 108 may include a support structure to hold the display device 104 or to attach the display device 104 with a surface (such as a wall).

The server 110 may include suitable logic, circuitry, and interfaces, and/or code that may be configured to store the content (such as the first content) to be rendered on the display device 104. In an embodiment, the server 110 may be configured to receive request for the first content from the electronic device 102 and further provide the requested first content to the electronic device 102. In an embodiment, the server 110 may be further configured to process the images and/or videos received from the set of imaging devices 106, determine one or more living objects in the captured images, and control the orientation of the display device 104 in the direction of the one or move living objects based on the first content rendered on the display device 104. The server 110 may be implemented as a cloud server and may execute operations through web applications, cloud applications, HTTP requests, repository operations, file transfer, and the like. Other example implementations of the server 110 may include, but are not limited to, a database server, a file server, a web server, a media server, an application server, a mainframe server, or a cloud computing server. In at least one embodiment, the server 110 may be implemented as a plurality of distributed cloud-based resources by use of several technologies that are well known to those ordinarily skilled in the art. A person with ordinary skill in the art will understand that the scope of the present disclosure may not be limited to the implementation of the server 110 and the electronic device 102 as two separate entities. In certain embodiments, the functionalities of the server 110 can be incorporated in its entirety or at least partially in the electronic device 102 without a departure from the scope of the disclosure.

The communication network 112 may include a communication medium through which the electronic device 102, the display device 104, the set of imaging devices 106, and the server 110 may communicate with each other. The communication network 112 may be one of a wired connection, a wireless connection or a combination thereof. Examples of the communication network 112 may include, but are not limited to, the Internet, a cloud network, Cellular or Wireless Mobile Network (such as Long-Term Evolution and 5G New Radio), a Wireless Fidelity (Wi-Fi) network, a Personal Area Network (PAN), a Local Area Network (LAN), or a Metropolitan Area Network (MAN). Various devices in the environment 100 may be configured to connect to the communication network 112 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the electronic device 102 may include or communicably control the display device 104 that may be configured to render the first content. Examples of the first content may include, but are not limited to, a recorded show, plays, commercials, a text message, an image, a video, an advertisement, or promotional content. In another example, the first content may be a real-time content (such as a live match, live news, a live show, etc.). The electronic device 102 and/or the server 110 may store a predefined playlist of content. The electronic device 102 may retrieve the playlist from the server 110 and provide the first content from the retrieved playlist to the display device 104. In an embodiment, such predefined playlist or the first content may be developed or hosted by a content provider, a service provider or a network provider for a selected or specific audience (such as one or more living objects 116) as a target. The specific content may be rendered on the display device 104 for the target audience to improve business prospects of the service provider, the content provider, or the network provider or to improve the business prospects of products and/or service promoted or advertised by the specific content (i.e. first content) rendered by the display device 104.

In accordance with an embodiment, the electronic device 102 may be further configured to control the set of imaging devices 106 (i.e. one or more imaging devices) to receive one or more images from the set of imaging devices 106. The reception of the one or more images from the set of imaging devices 106 is further described, for example, in FIGS. 3A-3B and 4A-4C. The set of imaging devices 106 may be configured to constantly monitor the predefined region 114 and provide one or more images and/or real-time video feeds to the electronic device 102. The predefined region 114 may be a physical space which may include one or more living objects 116 (such humans or animals). Examples of the predefined region 114 may include, but are not limited to, a shopping area, a mall, an airport, a railway platform, a stadium, a park, an entertainment area, an educational area, a fitness region, or a health-related region. The predefined region 114 may be close to the display device 104 such that the first content rendered by the display device 104 may be visible to one or more living objects 116 present in the predefined region 114. In some embodiments, the display device 104 may be present inside the predefined region 114.

In accordance with an embodiment, the received one or more images and/or real-time video feeds are to identify or recognize the one or more living objects, specifically humans in the predefined region 114, and further track the identified humans in the particular predefined region 114. The electronic device 102 may be further configured to determine a first position (i.e. three-dimensional position) of one or more living objects 116 within the predefined region 114 from the display device 104 based on the rendered first content. The details of the determination of the first position based on the rendered first content is further described, for example, in FIGS. 4A-4C. The electronic device 102 may be further configured to control the orientation of the display device 104 towards the determined first position of the one or more living objects, which is further described, for example, in FIGS. 3A-3B and 4A-4C. Thus, the electronic device 102 may be configured to display the first content to a targeted or selected audience for whom the first content may be relevant and/or may create a higher impact, such as increase sales or revenue for an owner or a creator associated with the first content, associated with products/services promoted by the first content, or associated with the display device 104.

In accordance with an embodiment, the electronic device 102 may be further configured to track the movement of the identified living objects 116 in the predefined region 114 based on the images and/or videos continuously received from the set of imaging devices 106. The electronic device 102 may further control the orientation of the display device 104 based on the movement of the living objects 116 identified based on the currently rendered first content. The control of the orientation based on the tracking of the movement of the living objects 116 is further described, for example, in FIG. 4C.

An advantage of the operations of the present disclosure may be to improve business prospects for an organization (e.g. service provider, the content provider or the network provider etc.) which may provide an appropriate advertisements and/or commercials (i.e. first content) for a specific product/service, and render such advertisements and/or commercials to humans, (i.e. one or more living objects 116) located in the pre-defined region 114. The disclosed electronic device 102 may control the set of imaging devices 106 to search/identify one or more living objects 116 in the predefined region 114 which may be relevant for the rendered advertisements and/or commercials, further control the orientation of the display device 104 in the direction towards the identified living objects 116. The disclosed electronic device 102 may further tracks the movement of one or more living objects 116 and controls the orientation of the display device 104 in different directions as per the movement of the relevant living objects 116. The rendering of such content for specific or targeted audience advantageously may result in an increased viewership of the commercial and may increase business prospects such as increases in revenues for an organization related to the content or related to the products/services advertised by the content, as the audience may buy related products/services as a result of watching the commercials, advertisements and/or promotional content.

Figure 2:
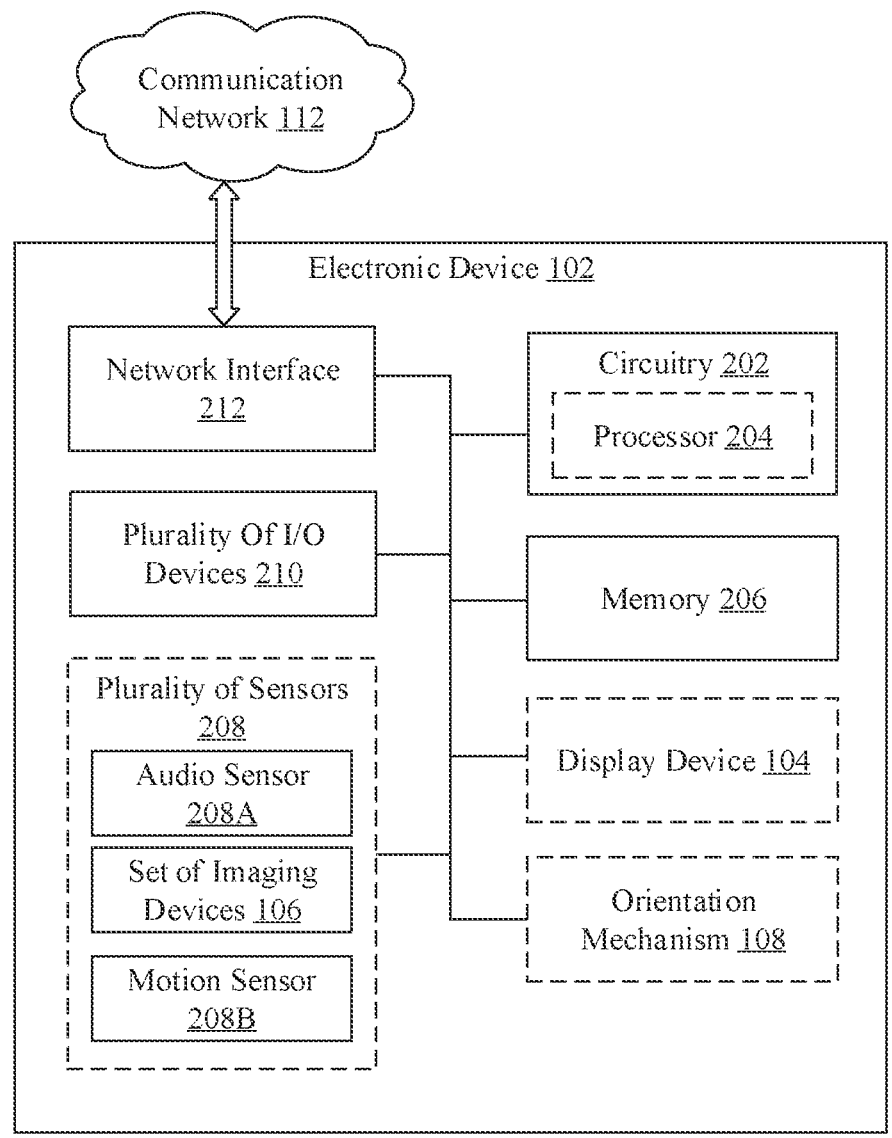
FIG. 2 is a block diagram that illustrates an electronic device for orientation control of a display device based on content, in accordance with an embodiment of the disclosure.

FIG. 2 is a block diagram that illustrates an electronic device for orientation control of a display device based on content, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, which may include one or more processors, such as a processor 204. The electronic device 102 may further include a display device 104 (i.e. similar to the display device 104 shown in FIG. 1), a memory 206, an orientation mechanism 108, a plurality of sensors 208, a plurality of input/output (I/O) devices 210, and a network interface 212. The plurality of sensors 208 may include, but are not limited to, an audio sensor 208A, a set of imaging devices 106 (i.e. similar to the set of imaging devices 106 shown in FIG. 1), and a motion sensor 208B. The circuitry 202 may be communicatively coupled with the display device 104, the memory 206, the orientation mechanism 108, the plurality of sensors 208, the plurality of I/O devices 210, and the network interface 212, via a set of communication ports/channels or a channel bus. In an embodiment, the display device 104, the orientation mechanism 108, and the plurality of sensors 208 are not integrated in the electronic device 102, however, deployed at different locations in the predefined region 114 (shown in FIG. 1). In such case, the display device 104, the orientation mechanism 108, and the plurality of sensors 208 are communicably coupled to the electronic device 102.

The circuitry 202 may include suitable logic, circuitry, and interfaces that may be configured to execute a set of instructions stored in the memory 206. The circuitry 202 may be configured to execute program instructions associated with different operations to be executed by the electronic device 102. For example, some of the operations may include control of one or more imaging devices (i.e. set of imaging devices 106) to receive one or more images/videos, control of the content being rendered on the display device 104, determination of a first position of one or more living objects 116 in the predefined region 114 based on the rendered content, and control of the orientation mechanism 108 to orient the display device 104 towards the selected one or more living objects (such as a selected living object 116A shown in FIG. 1). The circuitry 202 may include the processor 204 to perform different operations of the electronic device 102. Examples of the processor 204 may include, but are not limited to an x86-based processor, an x64-based processor, a Reduced Instruction Set Computing (RISC) processor, a Reduced Instruction Set Computing (RISC) processor, a Complex Instruction Set Computing (CISC) processor, a Graphics Processing Unit (GPU), programmable logic devices (PLDs), an Application-Specific Integrated Circuit (ASIC), SOC, FPGA, a microcontroller, a central processing unit (CPU), or other control circuits.

The memory 206 may comprise suitable logic, circuitry, interfaces, and/or code that may be configured to store instructions executable by the processor 204. The memory 206 may be configured to store the content (such as the first content and the second content) rendered on the display device 104. In an embodiment, the memory 206 may store a predefined list of content. The memory 206 may also store metadata related to the rendered content. The memory 206 may be further configured to store demographic information and/or profile information associated with one or more living objects 116 identified or recognized in the predefined region 114. The memory 206 may be further configured to store current 3D position or orientation of the display device 104 to render the content for the selected or targeted audience. Examples of implementation of the memory 206 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The plurality of sensors 208 may comprise suitable logic, circuitry, and interface that may be configured to detect different parameters related to one of more living objects 116. The plurality of sensors 208 may be positioned on the electronic device 102 or at different locations of the predefined region 114 to detect different parameters related to one or more living objects 116. Examples of different parameters may include, but are not limited to, a position of one or more living objects 116 in the predefined region 114, and a motion of the one or more living objects 116 with respect to the electronic device 102, voice data of one or more living objects 116, a facial expression of one or more living objects 116 in the predefined region 114, and a gesture/sign provided by one or more living objects 116. The plurality of sensors 208 may include, but are not limited to, the audio sensor 208A, the set of imaging devices 106, and the motion sensor 208B.

The audio sensor 208A may comprise suitable logic, circuitry, and interfaces that may be configured to capture voice data of one or more users, such as one or more living objects 116. The presence of one or more living objects 116 may be detected in the predefined region 114 based on the voice data captured by the audio sensor 208A. In some embodiments, one or more living objects 116 may be recognized based on the captured voice data. The captured voice data may be a part of the user input to provide voice commands to the electronic device 102 or may be used to determine the position of one or more living objects with respect to a position of the electronic device 102. The audio sensor 208A may be a microphone or a set of microphones (e.g., a microphone array) to capture the voice data of one or more living objects 116. Examples of the audio sensor 208A may include, but are not limited to, a recorder, an electret microphone, a dynamic microphone, a carbon microphone, a piezoelectric microphone, a fiber microphone, a (micro-electro-mechanical-systems) MEMS microphone, or other microphones known in the art.

The motion sensor 208B may comprise suitable logic, circuitry, and interfaces that may be configured to determine a presence or movement of one or more living objects 116 within the predefined region 114. The motion sensor 208B may provide an electrical signal or a pulse to the electronic device 102 based on the presence of one or more living objects 116 within the predefined region 114. In an embodiment, the electronic device 102 or the processor 204 may perform different operations based on the detection of the presence of one or more living objects 116 within the predefined region 114. The absence of the signal or pulse received from the motion sensor 208B may indicate that there is no one or more living objects 116 present within the predefined region 114 around the display device 104. In such case, the electronic device 102 may in a standby mode and may not perform different operations to save power. Examples of the motion sensor 208B may include, but are not limited to, an optical motion sensor, an acoustic motion sensor, an occupancy sensor, a microwave motion sensor, a flexible resistance sensor, a potentiometer-based sensor, or a pressure or stress-based sensor. In some embodiments, there may be multiple motion sensors and audio sensors, similar to the set of imaging devices 106, deployed at different locations in the predefined region 114 to detect the presence of one or more living objects 116 to further view the content rendered by the display device 104.

The plurality of I/O devices 210 may comprise suitable logic, circuitry, and interfaces that may be configured to provide an I/O channel/interface between one of more living objects 116 and the different operational components of the electronic device 102. The plurality of I/O devices 210 may receive a user input and present an output to one or more living objects 116. The plurality of I/O devices 210 may include various input and output ports to connect various other I/O devices that may communicate with different operational components of the electronic device 102. Examples of an input device of the plurality of I/O devices 210 may include, but are not limited to, the audio sensor 208A, the set of imaging devices 106, a touch screen, a keyboard/keypad, a set of buttons, a mouse, and a joystick. Examples of an output device of the plurality of I/O devices 210 may include, but are not limited to, a display device (for example, the display device 104), a speaker, and a haptic or a sensory output device. Other devices that may be covered under the plurality of I/O devices 210 may include, but are not be limited, to CD-R/RWs, DVDs, a Blu-ray drive, a Floppy diskette drive, hard drives, Modems, Network adapters, and SD Cards.

The network interface 212 may include suitable logic, circuitry, and interfaces that may be configured to facilitate communication between the electronic device 102, the display device 104, the plurality of sensors 208, and the server 110 (or any other device in the environment), via the communication network 112. The network interface 212 may be implemented by use of various known technologies to support wired or wireless communication of the electronic device 102 with the communication network 112. The network interface 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 212 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

FIGS. 3A and 3B are diagrams that collectively illustrate exemplary display device and orientation mechanism, in accordance with an embodiment of the disclosure. FIGS. 3A and 3B are described in conjunction with elements from FIG. 1 and FIG. 2. In FIGS. 3A and 3B, there is illustrated a specific predefined embodiment of the display device 104 and the orientation mechanism 108. It should be obvious to one skilled in the art, that the illustration shown herein is exemplary in nature and there could be various other possible ways of implementing the display device 104 and the orientation mechanism 108.

With reference to FIGS. 3A and 3B, there is shown the electronic device 102 which may include a display device 302 (i.e. similar to the display device 104 in FIG. 1). The electronic device 102 may further include an imaging device 304 (similar to the set of imaging devices 106 of FIG. 1). The electronic device 102 may further include an orientation mechanism 308 (similar to the orientation mechanism 108 of FIG. 1) which may be physically coupled with the display device 302. As shown in FIGS. 3A and 3B, the display device 302 and the orientation mechanism 308 (i.e. a single orientation mechanism or a plurality of orientation mechanisms as shown in FIGS. 3A and 3B) may be mounted onto a solid surface 310 (for example a wall) by means of a mounting device 306. The electronic device 102, the display device 302, the imaging device 304 and the orientation mechanism 308 have been discussed previously with respect to FIGS. 1 and 2.

As shown in FIGS. 3A and 3B, the display device 302 may be directly mounted on the solid surface 310, via the orientation mechanism 308 and the mounting device 306. The mounting device 306 is essentially a holder or a mechanism that fixes the arm of the orientation mechanism 308 to the solid surface 310. As shown in FIGS. 3A and 3B, for example, the mounting of the display device 302 onto the surface 310 is via the mounting device 306 and the orientation mechanism 308. The orientation mechanism 308 may include one or more actuators that may be configured to rotate in different 3-D directions and orient the display device 302 in the desired directions.

In an embodiment, as shown in FIGS. 3A and 3B, the imaging device 304 may be mounted on the display device 302. The imaging device 304 may be mounted or installed such that a field-of-view (FOV) of the imaging device 304 is towards the predefined region 114. For example, the imaging device 304 may be mounted on the top or bottom or on the sides of the display device 302. In an embodiment, a set of imaging devices, such as the imaging device 304, may be located at selected or predefined locations to capture images/video of different portions of the predefined region 114. The one or more living objects 116 (such as human) present at different portions of the predefined region 114 may view content (i.e. first content) rendered at the display device 302. The set of imaging devices (such as the set of imaging devices 106 shown in FIG. 1) may be communicably coupled with the electronic device 102 and/or the display device 302, to provide the captured images/video of one or more living objects 116 present at different portions of the predefined region 114. In an embodiment, the electronic device 102 may not include the display device 302, however, the display device 302 along with the orientation mechanism 308 may be communicably coupled with the processor 204 of the electronic device 102, via the communication network 112.

As shown in FIGS. 3A and 3B, the imaging device 304 mounted on top of the display device 302 is merely presented as an example. The imaging device 304 may be located anywhere within the predefined region 114 to monitor one or more living objects 116 and may be associated with the display device 302, without any deviation from the scope of the present disclosure. The imaging device 304 may be aligned at a particular angle with respect to an initial reference point to compute and track positions of one or more living objects 116 in the predefined region 114. In some embodiments, the imaging device 304 may rotate to change the field-of-view (FOV) to track positions of one or more living objects 116 in the predefined region 114.

In an embodiment, the display device 302 may be configured to render first content which can be viewed by one or more living objects 116 that are proximate to the display device 302 and present in the predefined region 114. The imaging device 304 may be configured to capture one or more images of the predefined region 114 which may include one or more living objects 116. The capture of the one or more images may be performed at periodic intervals. Alternatively, the imaging device 304 may be configured to stream video continuously to the electronic device 102, and the processor 204 may be configured to identify one or more living objects 116 in real-time based on the images/video received by the electronic device 102 and based on the rendered first content on the display device 302. The processor 204 may be configured to determine and select the living objects 116 (for example humans or animals) and further be configured to distinguish the humans from the animals, as the first content may be rendered for humans on the display device 302.

In an embodiment, the first content may be related or associated with a living object (for example humans from a particular section of population such as, but not limited to, sports fans, pregnant women, children, old aged people, etc.) who may be present in the predefined region 114. As shown in FIG. 3A, at an initial point in time, for example, the display device 302 and the imaging device 304 may be orientated along a reference line "A1" which may be considered as an initial reference position. For example, the display device 302 may be orientated along a horizontal X-axis in XYZ plane, as shown in FIG. 3A. Based on the rendered first content on the display device 302, the processor 204 may control the imaging device 304 (or the set of imaging devices 106 positioned at different locations of the predefined region 114) to capture one or more images/videos of different locations of the predefined region 114 and provide the captured images/video to the electronic device 102. The imaging device 304 (or the set of imaging devices 106) may be controlled to search one or more living objects 116 in the predefined region 114 which may be most relevant to the currently rendered first content. The details of the search of the relevant living object based on the rendered first content is further described, for example, in FIGS. 4A-4C.

In an embodiment, the processor 204 may be configured to simultaneously determine the first content rendered on the display device 302 in the initial reference position "A1". The first content may include associated metadata through which the processor 204 may determine information about a product advertised by the first content. The information may be a product name, a product type, a demographic of people to which the product may be relevant. In some embodiments, the metadata may indicate a genre of the product advertised by the first content. The processor 204 may be further configured to process the collected data (i.e. images/videos) from the imaging device 304 to determine or recognize one or more living objects 116 in the predefined region 114 and other information associated with the one or more living objects 116 as further described in, for example, FIGS. 4A-4B.

In an embodiment, once the processor 204 determines or recognizes one or more living objects 116 in the predefined region 114, based on the first content being rendered (for example an advertisement) and the processed data about the captured images/video, the processor 204 may be configured to orient the display device 302 in the direction of the recognized one or more living object 116 which may be relevant to the rendered first content. As shown in FIG. 3B, the display device 302 may be oriented in a direction which may be along a reference line "A2" that may be a direction where the recognized or selected one or more living objects 116 may be present in the predefined region 114. As shown in FIG. 3B, the display device 302 may be oriented at a particular angle to the horizontal X-axis in the XYZ plane. The display device 302 may be configured to be oriented in the direction of "A2" to render the first content to selected one or more living objects 116 who's current position is in the direction of "A2". The processor 204 may control the orientation mechanism 308 (i.e. a set of actuators) to orient the display device 302 at the angle along the direction "A2". As shown in FIGS. 3A and 3B, the initial orientation of the display device 302 (i.e. at direction "A1") and a final orientation (i.e. at direction "A2") of the display device 302 may not be along the same axis, and there may be a change in the direction of the display device 302, which may depend on the location of the one or more living objects 116 in the predefined region 114 determined based on the currently rendered first content as further described, for example, in FIGS. 4A-4C.

Figure 4A:
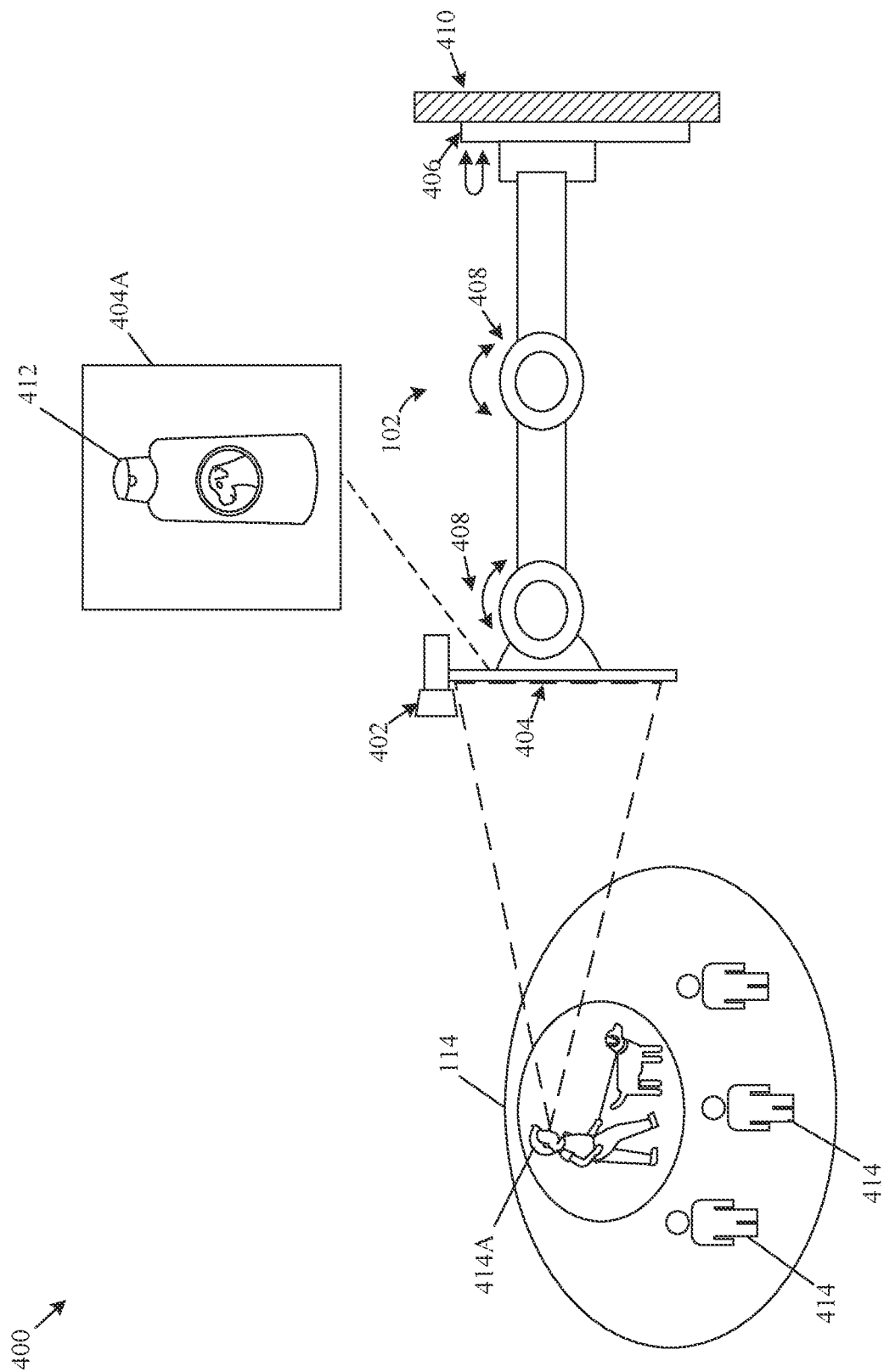
FIGS. 4A, 4B, and 4C are diagrams that collectively illustrate a scenario for orientation control of a display device based on content, in accordance with an embodiment of the disclosure.
Figure 4B:
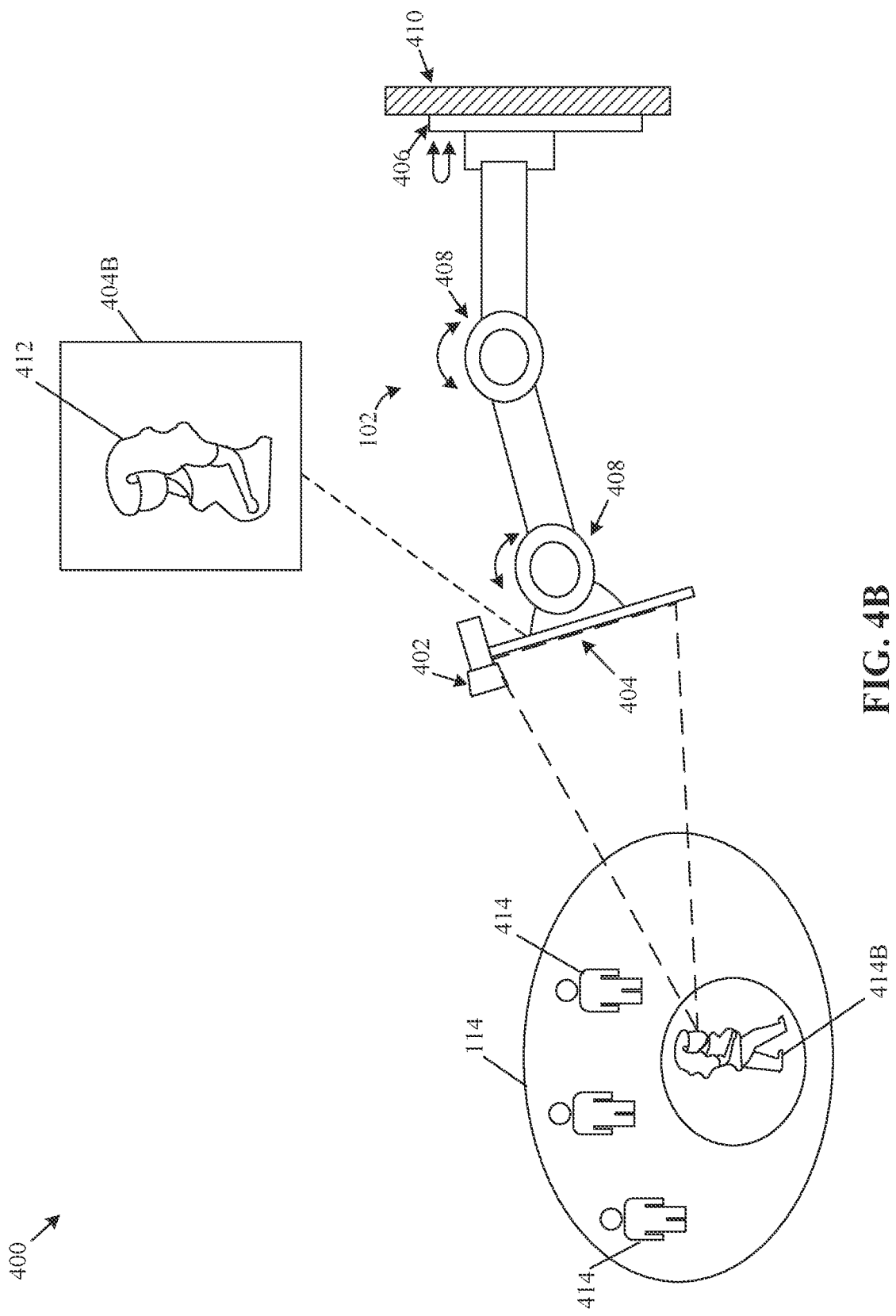
Figure 4C:
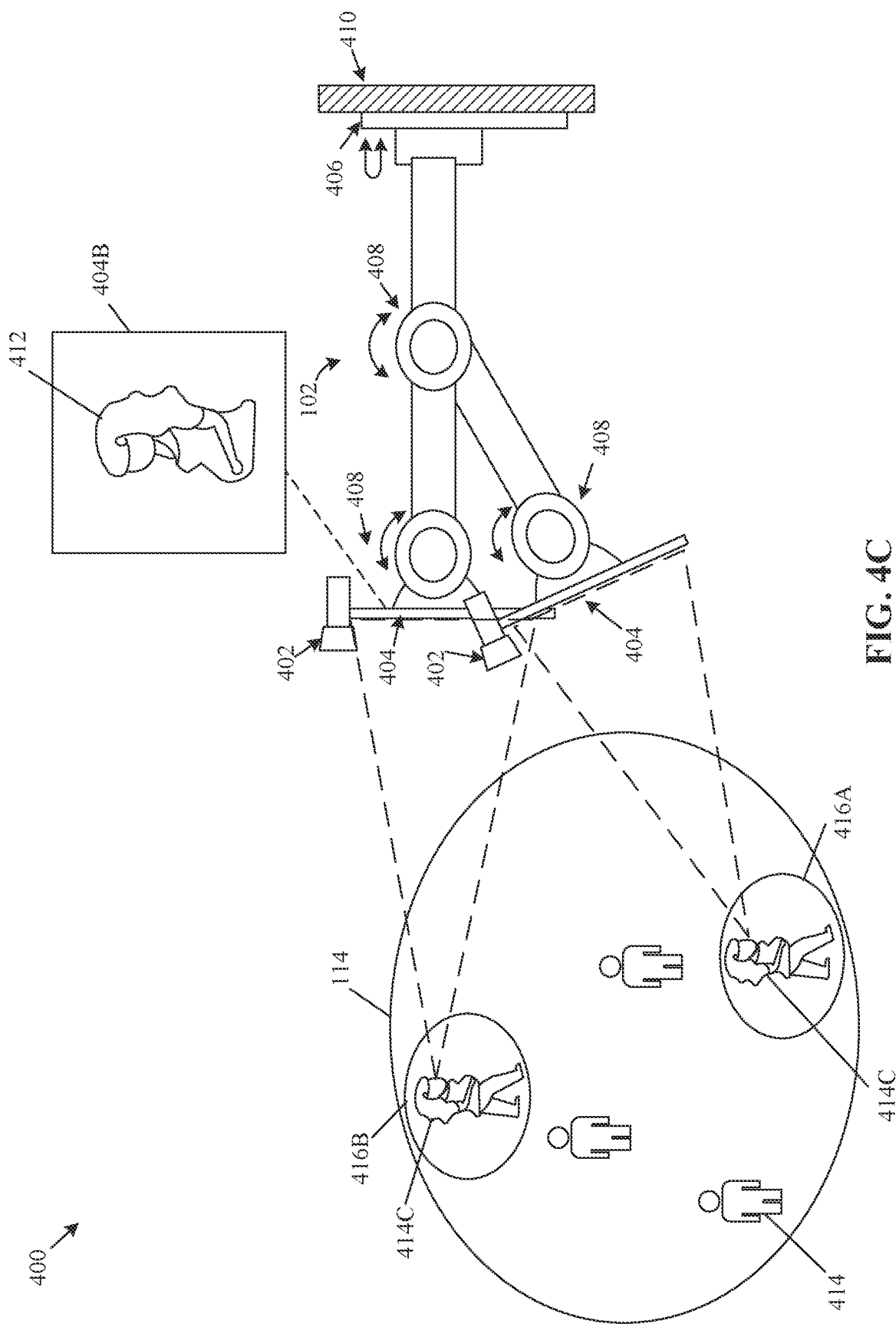

FIGS. 4A, 4B, and 4C are diagrams that collectively illustrate a scenario for orientation control of a display device based on content, in accordance with an embodiment of the present disclosure. FIGS. 4A, 4B, and 4C are described in conjunction with elements from FIGS. 1, 2, 3A, and 3B. With reference to FIGS. 4A, 4B, and 4C, the electronic device 102 may include a display device 404 that may be configured to render first content 404A which may be viewed by one or more living objects 414 that are proximate to the display device 404. The display device 404 may be mounted onto a hard surface 410 (such as a wall) by a mounting mechanism 406. The mounting mechanism 406 may have (or attached to) one or more orientation mechanism 408 (such as actuators) which may be configured to orient the display device 404 in the direction of selected living objects (such as a living object 414A shown in FIG. 4A or a living object 414B shown in FIG. 4B) out of the multiple living objects 414 present close to the display device 404 in the predefined region 114.

In an embodiment, the first content 404A being rendered on the display device 404 may be content that is predefined and fetched from the server 110 or from the memory 206. In some embodiments, the first content 404A may be selected from a predefined list of content stored in the memory 206 or in the server 110. The first content 404A may be selected based on the user input provided to the electronic device 102 by a user (such as an owner of the display device 404, the electronic device 102, or the first content 404A). In some embodiments, the first content 404A may be automatically selected based on current time of a day, such as specific content may be rendered for a morning time (say from 8:00 AM to 12:00 PM) and another content may be rendered for an evening time (say from 5:00 PM to 8:00 PM). Examples of the first content 404A may include, but are not limited to, a recorded show, plays, commercials, a text message, an image, a video, an advertisement, or promotional content. In another example, the first content 404A may be a real-time content (such as a live match, live news, or a live show). The first content 404A may be related to a product or a service which may be advertised or promoted by the first content 404A. In an embodiment, complete portion of the first content 404A may be related to the advertised product/service. In another embodiment, a certain portion of content (such as a recorded show) may include the first content (such as in between advertisement) related to a specific product/service. The specific first content 404A may be rendered on the display device 404 for the target audience to improve business prospects of the product/service promoted by the first content 404A. For example, as shown in FIG. 4A, the first content 404A may be an image related to a product 412 (i.e. drink or medicine for animals (like dogs)).

As shown in FIG. 4A, an imaging device 402 (i.e. similar to the imaging device 304 in FIG. 3A) may be included in (or communicably coupled with) the display device 404. The imaging device 402 may be configured to monitor the predefined region 114 proximate to the display device 404. The display device 404 and the imaging device 402 may be communicatively coupled to the processor 204 of the electronic device 102. The processor 204 may control the imaging device 402 to capture one or more images (or videos) of the predefined region 114 which may include one or more living objects 414. The imaging device 402 may change a field-of-view (FOV) to capture multiple images/videos of different portions of the predefined region 114. In an embodiment, the imaging device 402 may be mounted on a rotating mechanism (not shown) to change a direction of capture based on instruction received from the processor 204. The processor 204 may send the instructions to the imaging device 402 to rotate in different directions and capture one or more images/videos of different portions of the predefined region 114. In an embodiment, the imaging device 402 may capture one or more images or videos of the predefined region 114 at periodic intervals and stream the captured images/video to the processor 204 for processing (or to the server 110 for storage and processing). In an alternate embodiment, the predefined region 114 may include multiple imaging devices (such as the set of imaging devices 106) located at different locations of the predefined region 114 (such as a shopping mall, airport, other public places, etc.) to capture the images of different portions of the predefined region 114. The display device 404 may be visible from different portions of the predefined region 114 at different viewing angles. For example, few people present at a particular portion of the predefined region 114 may view a front side of the display device 404 and few people present at another portion of the predefined region 114 may view a rear side the display device 404 and may not be able to directly view the rendered first content 404A.

In an embodiment, the processor 204 of the electronic device 102 may be further configured to process the received one or more images of different portions of the predefined region 114 received from the imaging device 402 or received from the set of imaging devices 106. The processor 204 may process the received images to detect or recognize one or more living objects 414 (including humans, animals) present in the predefined region 114. The electronic device 102 may be configured to store and execute algorithms that are related to image processing, video processing, and object detection. Such algorithms may include a neural network (NN) model (such as, but not limited to, Convolutional Neural Networks (CNN), Region-Based Convolutional Neural Networks (RCNN), Fast R-CNN, YOLO network, or a deep learning model) or computer vision technology to detect/classify living objects (such as humans, animals) and further ignore non-living objects (such as, but not limited to, furniture items, electronic/electrical instruments, or decorative items).

The processor 204 may be further configured to determine demographic information of detected living objects 414 in the predefined region 114. In an embodiment, the demographic information may include, but is not limited to, a gender, an age, a race, an ethnicity, a marital status, an employment status, an education, or an income band about the detected living objects 414. In an embodiment, the processor 204 may perform different image processing techniques to determine the demographic information about the detected living objects 414 present in the predefined region 114. For example, based on facial features of a particular living object, the processor 204 may determine that the living object may be a male or a female. Similarly, based on the facial features and body features (like height, other body dimensions), the processor 204 may determine that the living object may be of a particular age group (like infant, kids, or adult). Further, the processor 204 may determine the demographic information for the recognized living objects 414 from the memory 206 or from the server 110 (or other public sources).

As shown in FIG. 4A, for example, there are five living objects in the predefined region 114, which includes four humans and one animal (i.e. dog). Further, for example, the first content 404A rendered on the display device 404 may be an image related to the product 412 (i.e. drink or medicine for animals (like dogs)). The five living objects may be present at different areas or portions of the predefined region 114. The processor 204 may be configured to control the imaging device 402 or the set of imaging devices 106 to capture images or videos of the living objects 414 present in different portions of the predefined region 114. The processor 204 may further process (like object detection) the images received from the imaging device 402 to detect/recognize the living objects 414 indicated in the received images/videos. For example, five living objects may be detected as four humans and one animal (such as a pet dog).

In an embodiment, the processor 204 may be further configured to analyze the first content 404A (for example an advertisement or a movie or a product promotional commercial) that may be currently rendered on the display device 404. The first content 404A may include metadata which may further include, but are not limited to, information associated with a product indicated by the first content 404A, information associated with a genre of the first content 404A, or information associated with one or more products indicated in one or more image frames of the first content 404A. For example, with respect to FIG. 4A, the metadata of the first content 404A may indicate that the product 412 may be a drink related to the animals. In another example, the metadata may indicate that the product/service indicated by the first content 404A may be related to a particular genre (like, but is not limited to, a party, musical, dance, art, literature, educational, travel, comedy, action, or romance) or the metadata may indicate a name or type of product included in an image frame of the first content 404A, or the metadata may indicate which gender or age group the indicated product/service belongs.

In an embodiment, the processor 204 may be configured to compare information about all the living objects 414 (i.e. indicated in the images received from the imaging device 402) with the metadata of the first content 404A currently rendered on the display device 404. For example, the processor 204 may determine which living object in the predefined region 114 or (which image includes the living object) which is mostly relevant to the product/service advertised/promoted in the first content 404A. In other words, the processor 204 may determine to which living object in the predefined region 114, the rendered first content 404A is mostly relevant. For example, as shown in FIG. 4A, the processor 204 may determine a living object 414A (i.e. among all the living objects 414 in the predefined region 114) who is accompanied by the identified animal (i.e. dog) and to whom the product (i.e. drink for animals) included in the rendered first content 404A may be most relevant. The living object 414A may be interested in watching promotional products with respect to pets. Thus, the processor 204 may search and compare all the received images/videos from the imaging device 402 (or from the set of imaging devices 106) with the metadata of the first content 404A to determine the most relevant image including the living object 414A (i.e. most targeted audience for the first content 404A currently on the display device 104). In other words, the processor 204 may search the most relevant audience (such as the living object 414A relevant to the rendered first content 404A) among the living objects 414 in the predefined region 114 who may view the display device 404.

In an embodiment, the processor 204 may further determine a first position (i.e. three-dimensional position in XYZ plane) for the living object 414A in the predefined region 114 based on further analysis of the relevant image which includes an image (or sub-image) for the relevant living object 414A. The processor 204 may identify the first position of the living object 414A in the predefined region 114 based on certain factors related to the imaging device 402 and related to the most relevant image (including image of living object 414A). The factors may include, but are not limited to, a fixed predefined position (in XYZ) of the imaging device 402 (or at least one of the set of imaging devices 106), a field-of-view of the imaging device 402 in the predefined region 114, zoom information of the imaging device 402 while capture of the image including the living object 414A, pixel information (like length-width in pixels of the living object 414A in the image), a resolution of the captured image and/or predefined dimensions of an image sensor of the imaging device 402 (or at least one or more living objects 414). Thus, the processor 204 may determine the first position of the living object 414A with the predefined region 114 based on the received image indicating the living object 414A and based on the first content 404A which is rendered on the display device 404 and is most relevant for the living object 414A among all the living objects 414 detected in the predefined region 114 around the display device 404. For example, in FIG. 4A, the first position of the determined living object 414A may be different from the respective position of other living objects 414 detected in the predefined region 114. In case of multiple relevant images (i.e. each including relevant living object for the first content 404A) determined, the processor 204 may determine the first position of each of the multiple relevant living objects (like living object 414A) within the predefined region 114.

In accordance with an embodiment, the processor 204 may further configured to control the orientation mechanism 408 to orient a screen of the display device 404 towards the determined first position of the living object 414A which is determined as the targeted audience for the first content 404A currently rendered on the display device 404. The orientation mechanism 408 may allow the display device 404 to rotate in different directions such that the display device 404 may be oriented towards the determined living object 414A present at the first position within the predefined region 114. Thus, the electronic device 102 may search the most relevant target audience (i.e. living object 414A) within the predefined region 114 based on the rendered first content 404A and orient the display device 404 (and the rendered first content 404A) towards such audience, such that the first content 404A may be clearly visible to such relevant audience and may create a higher impact (like increase in business), rather than visible to the living objects who may not be interested in the currently rendered first content 404A.

In case of multiple relevant living objects determined in the predefined region 114, the processor 204 may determine whether the multiple living objects are substantially close to each other and determine the first position to orient the display device 404, such that the screen of the display device 404 may be substantially visible to each living object determined as relevant based on the first content 404A. For example, the orientation mechanism 408 may be controlled to orient the display device 404 at a best viewing angle for the multiple living objects which are found relevant to the rendered first content 404A. In other case, where the relevant living objects are not positioned close to each other (for example determined living objects are 10 meters away from each other in the predefined region 114), the processor 204 may select one or more relevant living objects which are close to each other and determine the first position to further orient the display device 404 towards the selected one or more relevant living objects (such as the living object 414A, i.e. human with the animal). The processor 204 may select the living objects from multiple relevant living objects based on different criteria's (such as, but not limited to, a profile of a person, a past purchasing history of the person, or an orientation capability of the orientation mechanism 408). For example, the living object with a better purchasing history (like higher purchasing cost) for the rendered product/service, may be selected for the orientation of the display device 404 towards the selected living object. In some embodiments, the multiple living objects that are determined as relevant based on the rendered first content 404A, may be prioritized based their profile such that the business impact of the product/service shown by the first content 404A may be higher or positively impacted. For example, a living object with a better profile (like person with a higher salary band or a designation) may be first selected to orient the display device 404 towards such a living object, and then other relevant living objects may be selected to view the first content 404A based on the respective priorities. Therefore, the disclosed electronic device 102 may advantageously enhance business promotion for a dealer, a seller, or a manufacture of the product/service promoted by the rendered first content 404A based on the dynamic search of the relevant audience within the predefined region 114 and control of the display device 404 towards the relevant audience, based on the rendered first content 404A. Further, the dynamic and real-time search of relevant audience and orientation of the display device 404 based on the rendered first content 404A may also be advantageous for the relevant living object 414A (for example pet owner) to learn about new and relevant products/services available in the market, which may be of interest and/or may be beneficial for the living object 414A. Further, if the living object 414A (i.e. human with the animal) changes direction or move towards different place within the predefined region 114 (but remain proximate to the display device 404), the electronic device 102 may be configured to control orientation of the display device 404 in the direction of the living object 414A, as the imaging device 402 continuously monitors or track the movement of the relevant living object 414A selected based on the currently rendered first content 404A. The change in the orientation based on tracking of the living objects is further described, for example, in FIG. 4C.

With respect to FIG. 4B, for example, the display device 404 may render first content 404B which may include information or an image about a product 412 for pregnant women. Further, based on the rendered first content 404B, the processor 204 may receive images/videos from the imaging device 402 (or from the set of imaging devices 106) and further search the living objects 414 (i.e. based on the analysis of the received images/videos) in the predefined region 114 to determine one or more living objects for whom the rendered first content 404B is more relevant. For example, the predefined region 114 may include four living objects as three men and 1 women, as shown in FIG. 4B. Based on the analysis of the received images, the processor 204 may determine the gender and/or body dimensions of each living object in the predefined region 114 and determine that the living object 414B (i.e. pregnant women) may be most relevant for the rendered first content 404B (i.e. indicating the product 412 for pregnant women). As described in FIG. 4A, the processor 204 may further analyze the received image indicating the living object 414B to determine the first position (in XYZ) of the living object 414B in the predefined region 114. Further, the processor 204 may control the orientation mechanism 408 to change the orientation of the screen of the display device 404 towards the living object 414B (i.e. women) determined to be most relevant for the currently rendered first content 404B (i.e. product 412 for pregnant women). As shown in FIG. 4B, the direction of orientation of the display device 404 is different in comparison to the direction of orientation shown in FIG. 4A. Therefore, based on the real-time search of the most relevant living object 414B among the living objects 414 for the rendered first content 404B and control of the orientation of the display device 404 towards the most relevant living object 414B, the disclosed electronic device 102 may increase the business impact of the product/service indicated by the rendered first content 404B, as the living object 414B may be more interested to purchase the product 412, rather than other living objects who may present at the same time within the predefined region 114 in other directions and may not be interested in the product 412 shown by the first content 404B currently rendered on the display device 404.

In accordance with an embodiment, the processor 204 may be configured to determine the demographic information (such as, but not limited to a gender, an age, a race, an ethnicity, a marital status, an employment status, an education, or an income band) about the living objects 414 detected in the captured images received from the imaging device 402 (or the set of imaging devices 106). In some embodiments, the processor 204 may apply image processing technique to determine the demographic information about some of the living objects 414. In another embodiment, the processor 204 may recognize the living objects 414 (for example based on a face recognition) from the captured images, and retrieve the demographic information about the recognized living objects 414, where the demographic information may be already stored in the memory 206 or in the server 110. In some embodiments, the processor 204 may access the demographic information about the recognized living objects 414 from publicly information available on one or more social network websites or servers. Further, to determine the living object 414B that may be relevant to the currently rendered first content 404B, the processor 204 may compare the determined demographic information associated with the recognized living objects 414 with the first content 404B or with the stored metadata associated with the first content 404B. The processor 204 may further select one or more living objects (such as the living object 414B) from a plurality of living objects 414 present in the predefined region 114, based on the comparison between the demographic information and the first content 404B (or the metadata of the first content 404B). For example, in case the first content 404B is related a medicine for people of age group above 60, and the living object 414B is recognized as an old person (i.e. demographic information with age above 60), then the processor 204 may select such old person (i.e. living object 414B) from all the living objects 414 recognized or determined in the captured images/video of the predefined region 114. The selected old person (i.e. living object 414B) may be most relevant for the currently rendered first content 404B (i.e. such as about the medicine for people of age group above 60), which may not be of interest for other living objects present in proximity to the display device 404. The processor 204 may further determine the first position (in XYZ) of the living object 414B which may be determined based on the comparison of the rendered first content 404B (i.e. and associated metadata) and the determined demographic information of each of the living objects 414 detected in the predefined region 114 at the time of render of the first content 404B. In such case, the processor 204 may control the display device 404 to get oriented towards the first position (in XYZ) of the selected living object 414B.

In an embodiment, the memory 206 or the server 110 may store profile information about different living objects (i.e. humans). The profile information may include information about, but are not limited to, an educational background, a workplace designation, years of professional experience, hobbies, interests, likes/dislikes, a residential/work location (i.e. city, state, or country), a publicly known upcoming event, or a publicly known travel schedule). The processor 204 may be configured to retrieve the profile information about the living objects 414 which may be recognized based on the images/videos received from the imaging device 402 (or from the set of imaging devices 106) and further compare the retrieved profile information with the rendered first content 404B or with the metadata of the first content 404B. The processor 204 may further select a particular living object (such as living object 414B) from the recognized living objects 414 in the predefined region 114 based on the comparison between the profile information and the metadata of the first content 404B. For example, in case the first content 404B rendered on the display device 404 is related to a product for mountain trekking and the profile information of the particular living object 414B indicates that the living object 414B has high interest in mountain trekking, then such living object 414B may be selected among the other living objects 414 present around the display device 404. Further, the processor 204 may analyze the image of the selected living object 414B to determine the first position (in XYZ) of the living object 414B selected based on the match between the metadata of the currently rendered first content 404B and the profile information of the selected living object 414B. In another example, in case the first content 404B rendered on the display device 404 is related to a music of a particular genre and the profile information of the particular living object 414B indicates that the living object 414B has high interest in the music of the same genre, then such living object 414B may be selected among the other living objects 414 present around the display device 404.

In accordance with an embodiment, the processor 204 of the electronic device 102 may be further configured to change the content rendered on the display device 404 based on the demographic information of one or more living objects 414 detected in the predefined region 114. For example, in case the processor 204 is unable to search any relevant living object (i.e. in the predefined region 114 close to the display device 404) which may match the rendered first content 404B or associated metadata, the processor 204 may determine the demographic information of a living object (i.e. for example human who may be present in front of the display device 404) and render second content (i.e. different from the first content 404B) on the display device 404 for the living object present in front of the display device 404 or who may clearly view the second content. The second content may be relevant for such living object. For example, in case the living object in front of the display device 404 is a kid (i.e. for example of age between 6 to 10 as the demographic information), the processor 204 may select the second content (for example, content related to toys, story books, cartoons, etc.) which may be relevant for such living object of particular age group. In an embodiment, the memory 206 or the server 110 may store a predefined list of content. The predefined list of content may include a huge repository of content relevant for various types of demographics and profiles. In an embodiment, the processor 204 may be configured to retrieve or select the second content (i.e. from the predefined list of content) which may closely match with the demographic information or with the profile information of the living object. For example, in case the living object has an interest in sports (for example cricket), then the second content may be selected which may be related to the sports category, like content related to a sport equipment, a subscription offer for a sports channel or a sports website.

In accordance with an embodiment, the processor 204 may determine the demographic information of multiple living objects (such as living objects 414) present in the predefined region 114 and determine a demographic which may be common to most of the living objects present in the predefined region 114. In an embodiment, the processor 204 may determine the demographic information of multiple living objects when the electronic device 102 is unable to search and determine any relevant living object (i.e. like living object 414B in the predefined region 114 close to the display device 404) which may match the rendered first content 404B. Further, the processor 204 may select the second content which may match with the demographic which is determined as common to most of the living objects present in the predefined region 114. For example, the first content 404B rendered on the display device 404 is related to alcohols, and the living objects 414 determined to be present in the predefined region 114 are kids, in such case the processor 204 may determine the most common demographic (for example most of the kids are girls of age 6-10 years) of the present living objects 414 and change the first content 404B based on the retrieval of the second content (such as related to toys or clothing of young girls) from the memory 206 or the server 110.

In accordance with an embodiment, based on the orientation of the display device 404 towards the determined living object 414B which may be most relevant to the rendered first content 404B (i.e. as shown in FIGS. 4A and 4B), the processor 204 may further determine a facial expression of the living object 414B to determine whether the first content 404B oriented towards the living object 414B is actually liked or not by the living object 414B. To determine the facial expression, the processor 204 may control the imaging device 402 (or one of the set of imaging devices 106 with field-of-view including the living object 414B) to capture an image of the living object 414B. The processor 204 may analyze the captured image (i.e. including facial features) of the living object 414B to determine the facial expression of the living object 414B. The facial expression may indicate one or more motions or positions of muscles of a face of the living object 414A, where the facial expressions may manifest an emotion. The muscles of the face may move the skin of the living object 414B, may create facial lines/folds, or may cause the movement of facial parts, such as mouth, head, nose, eye, eyebrows of the living object 414B. The processor 204 may be configured to determine an emotional state of the living object 414B based on the determined facial expression of the living object 414B. The plurality of categories of user emotions may include, but are not limited to, a happy emotion, a sad emotion, an angry emotion, a calm emotion, a fear emotion, a neutral emotion, an excited emotion, a confused emotion, a stressed emotion, a disgusted emotion, a surprised emotion, an excitement emotion, or a scared emotion.

In case, the processor 204 may determine that the living object 414B has liked the rendered first content 404B based on a determination of the emotional state such as one of the happy emotion, the calm emotion, the exited emotion, the surprised emotion, or the surprised emotion. In contrast, based on the determination of the emotional state as one of the sad emotion, the sad emotion, the angry emotion, the confused emotion, the stressed emotion, the disgusted emotion, or the scared emotion, the processor 204 may determine that the living object 414B has not liked the first content 404B. In such case, the processor 204 may select the second content (i.e. different from the first content 404B) based on the determination of the facial expression or the emotional state indicating that the living object 414B has not liked the first content 404B rendered on the display device 404. The second content may be selected from the predefined list of content based on the demographic information and/or the profile information of the relevant living object 414A. The processor 204 may be further configured to control the display device 404 to render the selected second content towards the relevant living object 414B to convert the emotional state the living object 414B (say from the sad emotion to the happy emotion).

In accordance with an embodiment, after the orientation of the display device 404 towards the determined first position of the living object 414A, the processor 204 may be configured to control the customization of the rendered first content 404B for the living object 414B determined as relevant for the rendered first content 404B. In an embodiment, the processor 204 may be configured to customize the first content 404B for one or more living objects (such as the living object 414B) based on at least one of the demographic information, the profile information or the facial expression (like emotional state) of the living object 414B. For example, in case the first content 404B rendered on the display device 404 is related to a clothing of certain color (for example blue) and the processor 204 may determine from the profile information that the living object 414B may like red color or may have purchasing history related to red colored items. In such case, the processor 204 may customize the color of the same first content 404B (for example from a blue color clothing to the red color clothing) based on the profile information of the living object 414B. Based on the customization, the electronic device 102 may ensure to provide different alternatives of the same product/service rather than changing to another product of different manufactures or organization. Therefore, the customization of the rendered first content 404B may result in better business for content providers or for the manufactures/dealers of the product/service referred in the rendered first content 404B.

With respect to FIG. 4C, the processor 204 may be further configured to track the movement of the living object (i.e. determined as relevant to the currently rendered content) in the predefined region 114 in proximity of the display device 404. As shown with respect to FIG. 4C, for example, initially a living object 414C (for example a pregnant woman) is determined as relevant to currently rendered first content 404B and is detected to be at a first position 416A. The electronic device 102 may be further configured to control orientation of the display device 404 towards the direction of the living object 414C at the first position 416A, and render the first content 404B on the display device 404 for the living object 414C. For example, the living object 414C (for example pregnant woman) has moved from the first position 416A to a second position 416B within the same predefined region 114. The processor 204 may further control the imaging device 402 (or the set of imaging devices 106) to continuously monitor or track the movement of the living object 414C over time (for example till the living object 414C is within the field of view of the imaging device 402/set of imaging devices 106 or till the time the first content 404B is rendered on the display device 404) and concurrently transmit the captured images or videos of the living object 414C to the processor 204 of the electronic device 102. Based on the received images/videos, the processor 204 may be further configured determine the new position (i.e. second position 416B) of the living object 414C and further control the orientation of the display device 404 towards the new position (i.e. second position 416B) at which the living object 414C (i.e. pregnant woman) may be currently located (as shown in FIG. 4C where the orientation of the display device 404 has changed towards the second position 416B from the first position 416A). In an alternate embodiment, if the living object 414C at the first position 416A (or at the second position 416B) moves to another predefined region (not shown), the disclosed electronic device 102 may be configured to detect the movement of the living object 414C from the predefined region 114 to the other predefined region (for example via the images received from the imaging devices of the other predefined region). Further, the electronic device 102 may transfer control to render the first content 404B on a display device (not shown) present in the other predefined region, and control the orientation of such display device in the direction of the living object 414C in the other predefined region. Thus, based on the real-time tracking of the living object (i.e. determined as highly relevant audience for the rendered content), the disclosed electronic device 102 may ensure that the content may be displayed to the living object for certain period of time despite of movement of the living object 414C in the predefined region 114. This may further increase the business impact for the rendered content (or the product/service indicated by the content) or for the manufacture/dealer of the rendered product/service.

In accordance with an embodiment, the processor 204 may be configured to detect a gesture/sign, in additional to the detection of the living objects 414 from the images/videos received from the set of imaging devices 106 (shown in FIG. 1). In an embodiment, the set of imaging devices 106 may be configured to pick up gestures (such as facial expression, hand signs, etc.) of the living objects 414, and provide the corresponding captured image frames to the electronic device 102. For example, consider a group of users (i.e. one or more living objects 116 shown in FIG. 1) are present at an airport or a mall in a predefined region 114, and one user (such a living object 116A) would like to drink a coffee. If the user provides a gesture (for example, but not limited to, a coffee cup sign, or drink in sign language, or holding the thumb close to the mouth, or mimic drinking), then one of the set of imaging device 106 may be configured to capture an image of such user and further transmit the gesture/sign in the captured image to the electronic device 102. The processor 204 of the electronic device 102 may further recognize the received gesture/sign and accordingly fetch relevant content, for example directions to a coffee shop at an airport plaza (or a shopping mall), or advertisements/commercials related to coffee/tea with a location of the nearest shop(s). The processor 204 may further render the content (i.e. fetched from the memory 206 or the server 110) on the display device 104 and further control orientation of the display device 104 in the direction of the user from whom the gesture/sign has been received. The content rendered on the display device 104 may include a specific location and a path to the coffee/tea shop, and further include additional information (such as a menu, a discount offer, or other commercials/advertisements) related to the coffee/tea (or any other product/service). As an example, a list of registered gestures/signs may be made available for the living objects and may be posted/published close to the set of imaging devices 106 and/or the display device 104, such the living objects 116 may look up the signs/gestures to be made for various products/service. Further, the memory 206 or the server 110 may store a mapping between the registered gestures/signs and corresponding content to be rendered. Therefore, for a particular gesture/sign made by the living object 116A, an appropriate content may be searched and fetched from the server 110 or the memory 206, and further render the content on the display device 104. The electronic device 102 may further configured to control the orientation of the display device 104 in the direction of the living object 116A. Advantageously this may result in better business promotion for the manufactures/dealers/sellers of the rendered product/service or may result in better business revenue for content providers.

In an embodiment, the processor 204 may be configured to receive a voice request or command from the living object 116A. For example, the living object 116A is located at an airport or shopping mall (i.e. predefined region 114) and provide the voice request (for example "I want to drink coffee"). In such case, the audio sensor 208A of the electronic device 102 may capture signals related to the voice request and provide the captured signals to the processor 204. In some embodiments, different audio sensors may be located at different place of the predefined region 114 or integrated with the set of imaging devices 106. The processor 204 may be further configured to interpret the received voice request and accordingly fetch the appropriate content (for example information related to the location of the coffee shops in nearby areas, map information to reach the location, and/or render commercials/advertisement related to the coffee) from the memory 206 or the server 110. The processor 204 may further render the content on the display device 104 (shown in FIG. 1) and orient the display device 104 towards the living object (i.e. human) who made the voice request.

Figure 5:
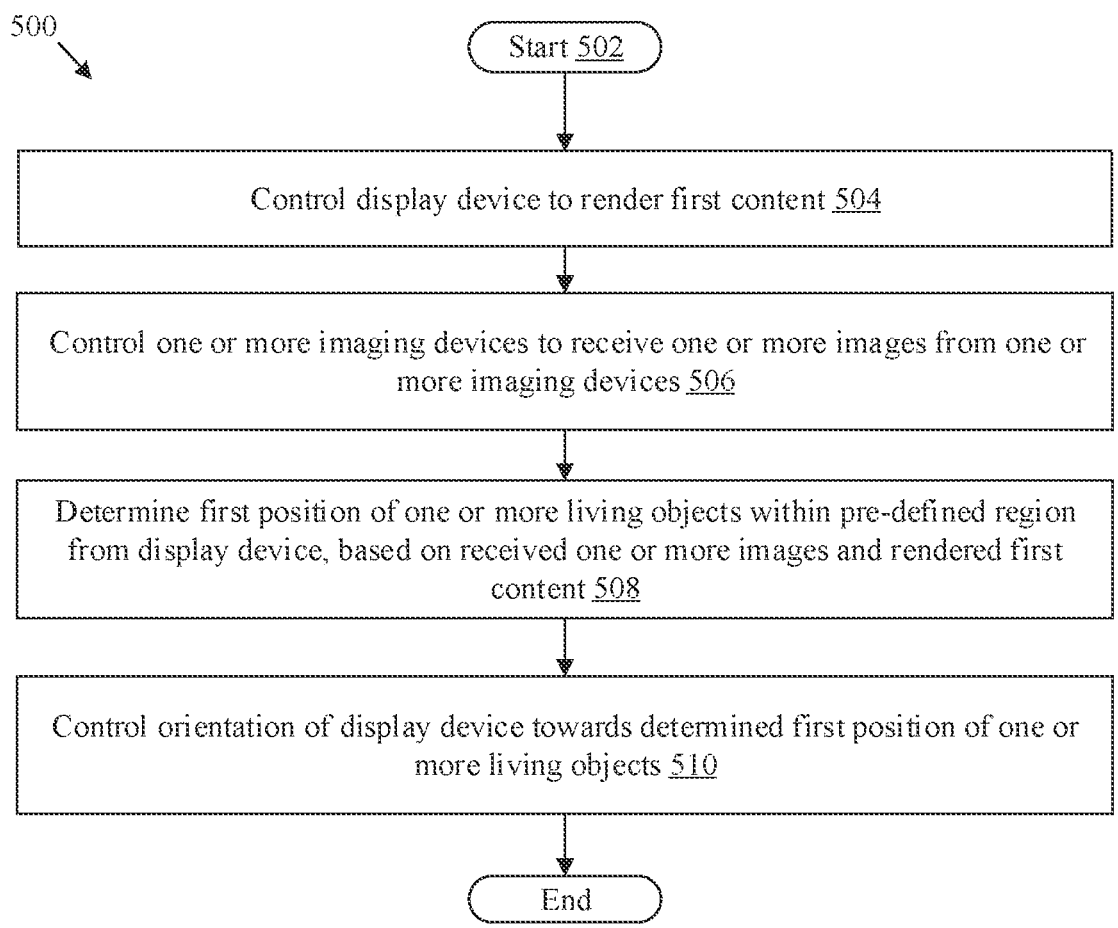
FIG. 5 is a flowchart that illustrates an exemplary method for orientation control of a display device based on content, in accordance with an embodiment of the disclosure.

FIG. 5 is a flowchart that illustrates an exemplary method for orientation control of a display device based on content, in accordance with an embodiment of the disclosure. FIG. 5 is described in conjunction with elements from FIGS. 1, 2, 3A, 3B, 4A, 4B, and 4C. With reference to FIG. 5, there is shown a generic flowchart 500. The operations of the flowchart 500 may be executed by a computing system, such as the electronic device 102 or the processor 204. The operations of the method begins at 502 and proceed to 504.

At 504, the display device 104 may be controlled to render first content. In an embodiment, the electronic device 102 may be configured to control the display device 104 to render the first content which may also include metadata associated with the first content being rendered on the display device 104. The details of the first content rendered on the display device 104 and the metadata are described, for example, in FIGS. 4A and 4B.

At 506, one or more imaging devices may be controlled to receive one or more images from the one or more imaging devices (such as the set of imaging devices 106. In an embodiment, the electronic device 102 may be configured to control one or more imaging devices 106 to capture one or more images and/or video streams. The electronic device 102 may further receive the captured images and/or videos from the set of imaging devices 106 as described, for example, in FIGS. 3A-3B and 4A-4C.

At 508, a first position of one or more living objects may be determined within the predefined region 114 from the display device 104. The electronic device 102 may be configured to determine the first position of the one or more living objects within the predefined region 114 based on the received images and/or video stream, and further based on the first content rendered on the display device 104 as described, for example, in FIGS. 4A-4B.

At 510, an orientation of the display device 104 may be controlled towards the determined first position of one or more living objects. In an embodiment, the electronic device 102 may be configured to control the orientation of the display device 104 towards the determined first position of one or more living objects (such as the living object 116A) as described, for example, in FIGS. 3A-3B and 4A-4C.

Although the flowchart 500 is illustrated as discrete operations, such as 504, 506, 508, and 510, the disclosure is not construed to be so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, instructions executable by a machine and/or a computer (for example the electronic device 102). The instructions may cause the machine and/or computer (for example the electronic device 102) to perform operations that include control of a display device (such as the display device 104) to render first content. The operations further include control of one or more imaging devices (such as the set of imaging devices 106) to receive one or more images from the one or more imaging devices. The operations further include determination of a first position of one or more living objects (such as one or more living objects 116) within a pre-defined region (such as predefined region 114) from the display device, based on the received one or more images and the rendered first content. The operations further include control of an orientation of the display device towards the determined first position of the one or more living objects.

Exemplary embodiments of the present disclosure may include an electronic device (such as the electronic device 102 in FIG. 1) and a display device (such as the display device 104 in FIG. 1), wherein the display device 104 may be configured to render first content. The electronic device 102 may be communicably coupled to the display device 104. The electronic device 102 may be configured to control one or more imaging devices (such as the set of imaging devices 106) to receive one or more images and/or one or more real-time feeds (video stream) from the one or more imaging devices. Based on the received one or more images and/or the video stream, the electronic device 102 may be configured to determine a first position of one or more living objects (such as one or more living objects 116 in FIG. 1) within a predefined region (such as the predefined region 114 in FIG. 1) from the display device 104. Based on the received one or more images and the rendered first content; the electronic device 102 may be configured to control an orientation of the display device 104 towards the determined first position of the one or more living objects 116.

In an embodiment, the electronic device 102 may be configured to determine demographic information associated with the one or more living objects 116 recognized in the received one or more images. The electronic device 102 may be further configured to compare the demographic information associated with the recognized one or more living objects 116 with the rendered first content. The electronic device 102 may be further configured to determine the first position of the one or more living objects within the predefined region 114 based on the comparison.

In an embodiment, based on the demographic information, the electronic device 102 may be further configured to select a second content to be rendered to the one or more living objects 116, wherein the second content may be different from the first content. The electronic device may be further configured to control the display device 104 to render the second content. In an embodiment, the electronic device 102 may include a memory 206, that may be configured to store a predefined playlist of content. The processor 204 may be further configured to select the second content from the predefined playlist of content for the one or more living objects 116.

In an embodiment, the electronic device 102 may be configured to determine a facial expression (or gesture or sign) of the one or more living objects 116 based on the orientation of the display device 104 towards the first position of the one or more living objects 116. The electronic device 102 may be further configured to select second content to be rendered to the one or more living objects 116 based on the determined facial expression (or gesture, sign), wherein the second content is different from the first content. The electronic device 102 may be configured to control the display device 104 to render the selected second content.

In an embodiment, the electronic device 102 may be further configured to determine the first position of the one or more living objects 116 within the predefined region 114 based on metadata associated with the first content rendered on the display device 104. In a further embodiment, the metadata associated with the first content may include at least one of information associated with a product indicated by the first content, information associated with a genre, or information associated with one or more products indicated in one or more image frames.

In an embodiment, the electronic device 102 may be configured to retrieve profile information associated with the one or more living objects 116. The electronic device 102 may be configured to compare the retrieved profile information of the one or more living objects 116 with metadata of the rendered first content. Based on the comparison, the electronic device 102 may be further configured to determine the first position of the one or more living objects 116 within the predefined region 114.

In an embodiment, the electronic device 102 may be configured to determine demographic information associated with each of a plurality of living objects recognized in the received one or more images. The electronic device 102 may be further configured to select the one or more living objects from the recognized plurality of living objects 116 based on the demographic information and the first content. The electronic device 102 may be further configured to control the orientation of the display device 104 towards the first position of the selected one or more living objects 116.

In an embodiment, the electronic device 102 may be further configured to track a change from the first position of the one or more living objects to a second position within the predefined region 114; and control the orientation of the display device 104 towards the second position of the one or more living objects 116. In an embodiment, the second position may be in another predefined region, wherein the electronic device 102 may be configured to transfer control or the content being rendered on the display device 104 in the first predefined region 114 to a display device in the other predefined region.

In a further embodiment, the electronic device 102 may be configured to customize the first content (or the second content) for the one or more living objects 116 based on one of demographic information, profile information, or a facial expression associated with the one or more living objects 116, wherein customization of the first content (and/or second content) is based on the orientation of the display device 104 towards the first position of the one or more living objects 116.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. An electronic device, comprising:
a display device configured to render first content; and
a processor communicably coupled to the display device, wherein the processor is configured to:
control one or more imaging devices to receive one or more images from the one or more imaging devices;
select, based on metadata of the rendered first content, one or more living objects from a plurality of living objects present within a pre-defined region from the display device,
wherein the one or more living objects are selected from the one or more images received from the one or more imaging devices;
retrieve profile information associated with the one or more living objects;
compare the retrieved profile information of the one or more living objects with the metadata of the rendered first content;
determine a first position of the selected one or more living objects within the pre-defined region based on the received one or more images, and
the comparison between the retrieved profile information of the one or more living objects and the metadata of the rendered first content; and
control an orientation of the display device towards the determined first position of the one or more living objects.

2. The electronic device according to claim 1, wherein the processor is further configured to:
determine demographic information associated with the one or more living objects selected in the received one or more images;
compare the demographic information associated with the selected one or more living objects, with the rendered first content; and
determine, based on the comparison, the first position of the one or more living objects within the pre-defined region.

3. The electronic device according to claim 2, wherein based on the demographic information, the processor is further configured to:
select second content to be rendered to the one or more living objects, wherein the second content is different from the first content; and
control the display device to render the selected second content.

4. The electronic device according to claim 3, further comprising a memory configured to store a predefined playlist of content, wherein the processor is further configured to select the second content from the predefined playlist of content.

5. The electronic device according to claim 1, wherein the processor is further configured to:
determine a facial expression of the one or more living objects based on the orientation of the display device towards the first position of the one or more living objects;
select second content to be rendered to the one or more living objects based on the determined facial expression, wherein the second content is different from the first content; and
control the display device to render the selected second content.

6. The electronic device according to claim 1, wherein the processor is further configured to determine the first position of the one or more living objects within the pre-defined region based on the metadata associated with the first content rendered on the display device.

7. The electronic device according to claim 6, wherein the metadata associated with the first content comprises at least one of information associated with a product indicated by the first content, information associated with a genre, or information associated with one or more products indicated in one or more image frames.

8. The electronic device according to claim 1, wherein the processor is further configured to:
determine demographic information associated with each of the plurality of living objects selected in the received one or more images;
select the one or more living objects from the selected plurality of living objects based on the demographic information and the first content; and
control the orientation of the display device towards the first position of the selected one or more living objects.

9. The electronic device according to claim 1, wherein the processor is further configured to:
track a change from the first position of the one or more living objects to a second position within the pre-defined region; and
control the orientation of the display device towards the second position of the one or more living objects.

10. The electronic device according to claim 1, wherein the processor is further configured to customize the first content for the one or more living objects based on one of demographic information, the profile information, or a facial expression associated with the one or more living objects, and
the customization of the first content is based on the orientation of the display device towards the first position of the one or more living objects.

11. The electronic device according to claim 1, further comprising a memory configured to store information about the orientation of the display device.

12. A method, comprising:
in an electronic device:
controlling a display device to render first content;
controlling one or more imaging devices for receiving one or more images from the one or more imaging devices;
selecting, based on metadata of the rendered first content, one or more living objects from a plurality of living objects present within a pre-defined region from the display device, wherein the one or more living objects are selected from the one or more images received from the one or more imaging devices;
retrieving profile information associated with the one or more living objects;
comparing the retrieved profile information of the one or more living objects with the metadata of the rendered first content;
determining a first position of the selected one or more living objects within the pre-defined region based on the received one or more images, and
the comparison of the retrieved profile information of the one or more living objects with the metadata of the rendered first content; and
controlling an orientation of the display device towards the determined first position of the one or more living objects.

13. The method according to claim 12, further comprising:
  determining demographic information associated with the one or more living objects selected in the received one or more images;
  comparing the demographic information associated with the selected one or more living objects, with the rendered first content; and
  based on the comparison, determining the first position of the one or more living objects within the pre-defined region.

14. The method according to claim 13, based on the demographic information, further comprising:
  selecting second content to be rendered to the one or more living objects, wherein the second content is different from the first content; and
  controlling the display device to render the selected second content.

15. The method according to claim 12, further comprising:
  determining a facial expression of the one or more living objects based on the orientation of the display device towards the first position of the one or more living objects;
  selecting second content to be rendered to the one or more living objects based on the determined facial expression, wherein the second content is different from the first content; and
  controlling the display device to render the selected second content.

16. The method according to claim 12, further comprising determining the first position of the one or more living objects within the pre-defined region based on the metadata associated with the first content rendered on the display device.

17. A non-transitory computer-readable medium having stored thereon, computer-executable instructions that when executed by an electronic device, causes the electronic device to execute operations, the operations comprising:
  controlling a display device to render first content;
  controlling one or more imaging devices for receiving one or more images from the one or more imaging devices;
  selecting, based on metadata of the rendered first content, one or more living objects from a plurality of living objects present within a pre-defined region from the display device, wherein the one or more living objects are selected from the one or more images received from the one or more imaging devices;
  retrieving profile information associated with the one or more living objects;
  comparing the retrieved profile information of the one or more living objects with the metadata of the rendered first content;
  determining a first position of the selected one or more living objects within the pre-defined region based on
    the received one or more images, and
    the comparison of the retrieved profile information of the one or more living objects with the metadata of the rendered first content; and
  controlling an orientation of the display device towards the determined first position of the one or more living objects.

18. The non-transitory computer-readable medium according to claim 17, further comprising
  determining demographic information associated with the one or more living objects selected in the received one or more images;
  comparing the demographic information associated with the selected one or more living objects, with the rendered first content; and
  based on the comparison, determining the first position of the one or more living objects within the pre-defined region.

19. The non-transitory computer-readable medium according to claim 18, based on the demographic information, further comprising:
  selecting second content to be rendered to the one or more living objects, wherein the second content is different from the first content; and
  controlling the display device to render the selected second content.

20. The non-transitory computer-readable medium according to claim 17, further comprising determining the first position of the one or more living objects within the pre-defined region based on the metadata associated with the first content rendered on the display device.

* * * * *